(12) United States Patent
Clark

(10) Patent No.: US 7,712,745 B2
(45) Date of Patent: May 11, 2010

(54) UNITIZED PINION SEAL FOR AN AXLE

(75) Inventor: Keith Clark, Rumney, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 55 days.

(21) Appl. No.: 10/553,590

(22) PCT Filed: Apr. 16, 2004

(86) PCT No.: PCT/US2004/011987

§ 371 (c)(1),
(2), (4) Date: Oct. 25, 2006

(87) PCT Pub. No.: WO2004/094877

PCT Pub. Date: Nov. 4, 2004

(65) Prior Publication Data

US 2007/0102885 A1 May 10, 2007

Related U.S. Application Data

(60) Provisional application No. 60/463,293, filed on Apr. 16, 2003.

(51) Int. Cl.
*F16J 15/02* (2006.01)

(52) U.S. Cl. .................................. 277/551; 277/572

(58) Field of Classification Search ................. 277/309, 277/549, 551, 562, 571, 572, 573, 576, 577
See application file for complete search history.

(56) References Cited

U.S. PATENT DOCUMENTS

| 3,135,518 | A | * | 6/1964 | Carson et al. | ............... 277/351 |
|---|---|---|---|---|---|
| 4,136,885 | A | * | 1/1979 | Uhrner | ...................... 277/374 |
| 4,327,922 | A | * | 5/1982 | Walther | ...................... 277/571 |
| 4,428,586 | A | * | 1/1984 | Romero | ...................... 277/565 |
| 4,448,426 | A | * | 5/1984 | Jackowski et al. | .......... 277/353 |
| 4,856,794 | A | * | 8/1989 | Boyers et al. | ................ 277/571 |
| 5,096,207 | A | * | 3/1992 | Seeh et al. | ................... 277/353 |
| 5,186,472 | A | * | 2/1993 | Romero et al. | .............. 277/351 |
| 5,201,529 | A | * | 4/1993 | Heinzen | ...................... 277/351 |
| 5,269,536 | A | * | 12/1993 | Matsushima et al. | ........ 277/349 |
| 6,083,109 | A | * | 7/2000 | Gerulski | ...................... 464/175 |
| 6,170,992 | B1 | * | 1/2001 | Angelo et al. | ................ 384/477 |
| 6,729,623 | B2 | * | 5/2004 | Visconti | ...................... 277/549 |

* cited by examiner

*Primary Examiner*—Vishal Patel
(74) *Attorney, Agent, or Firm*—Ronald W. Wangerow; Harness, Dickey & Pierce, P.L.C.

(57) ABSTRACT

A unitized pinion seal assembly has a seal portion and a sleeve portion that are assembled in an interference fit relationship. The unitized pinion seal assembly is assembled to a carrier/bearing cage and an axle companion flange with proper spacing between non-sealing components, and without a spacer mounted between the two portions.

18 Claims, 4 Drawing Sheets

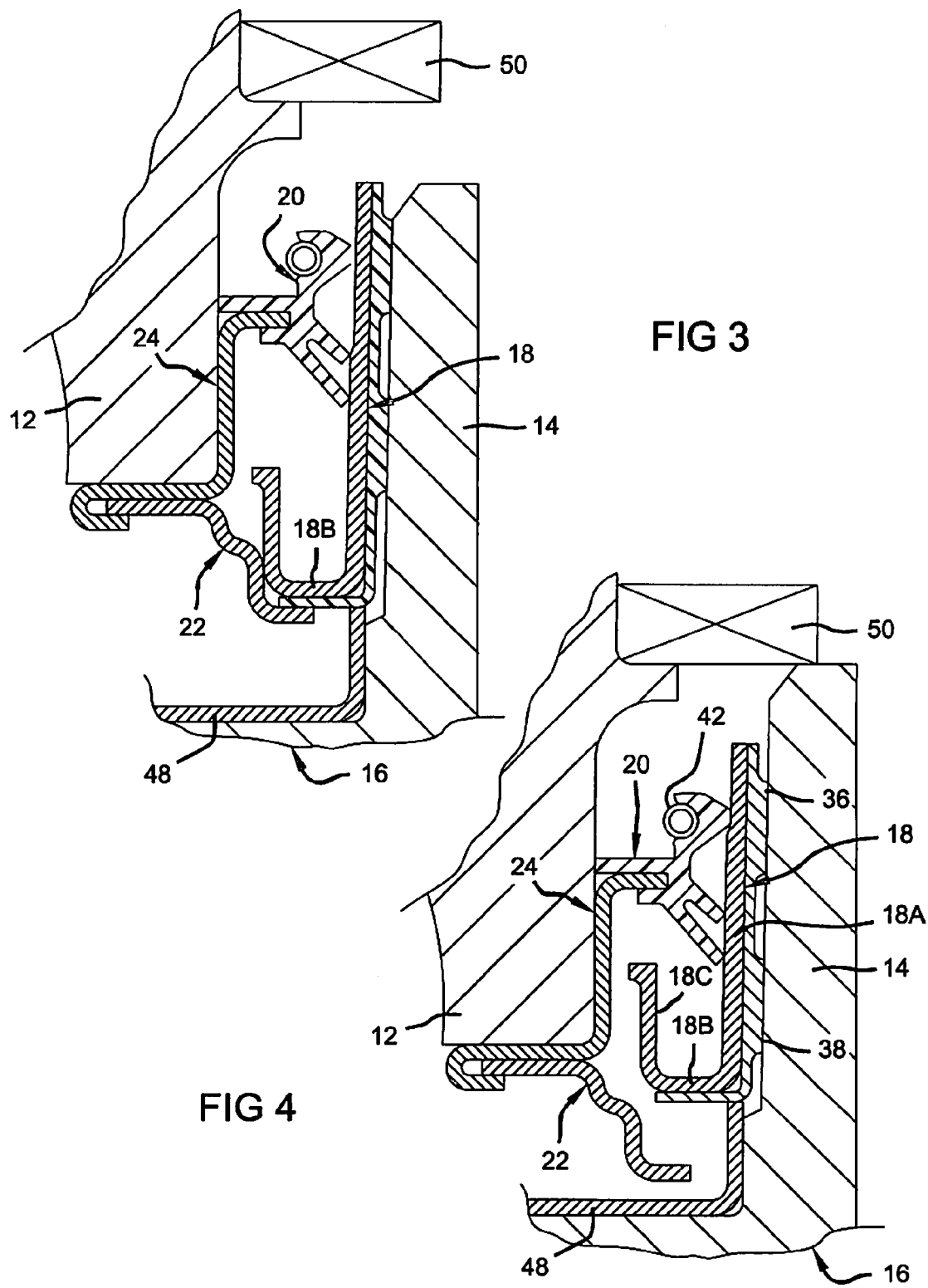

UNITIZED PINION SEAL FOR AN AXLE

CROSS-REFERENCE TO RELATED APPLICATIONS

This application claims the benefit of U.S. Provisional Application No. 60/463,293, filed on Apr. 16, 2003. The disclosure of the above application is incorporated herein by reference.

FIELD OF THE INVENTION

The present invention relates in general to seals and more particularly to a pinion seal used to seal about an axle pinion.

BACKGROUND OF THE INVENTION

During assembly of an axle, a pinion seal is assembled between an axle companion flange and a carrier/bearing cage. The pinion seal includes a sleeve portion, which is mounted to and rotates with the axle companion flange, and a seal portion, which is mounted to and is stationary with the carrier/bearing cage. The two end up, then, in sliding engagement at seal contact locations. This requires an axial spacing between certain portions of the two components to assure that the only contact is at the seal contact locations. Thus, in order to accomplish the proper installation of the sleeve portion and seal portion, a contacting spacer is typically employed between the sleeve and the seal. This is particularly true if one attempts to assemble the two portions as a single unit. However, a contacting spacer located between the seal and sleeve components will generally cause, higher torque loss, additional noise, and increased heat generation due to the additional friction between components.

Also, during assembly, since the sleeve portion and the seal portion are typically assembled separately, this may allow contamination to enter the seal. Consequently, it is desirable to have a unitized seal where the two portions can be assembled as one. Being able to assemble the pinion seal as a unitized assembly would also be desirable in order to improve the assembly process.

Thus, it is desirable to have a unitized pinion seal for axle pinion applications that can be assembled as a unit and have a bearing configuration suitable for supporting and spacing the stationary (seal) and rotating (sleeve) components during assembly of the axle.

SUMMARY OF THE INVENTION

In its embodiments, the present invention contemplates a unitized pinion seal as shown and described herein.

The present invention further contemplates a method of assembling a unitized pinion seal to a carrier/bearing cage and an axle companion flange as shown and described herein.

An advantage of an embodiment of the present invention is that the unitized seal design will shield the critical areas of the seal during installation, which minimizes the chance for receiving contamination in or damage to critical areas of the seal. Moreover, by shielding the critical areas of the seal, a ground surface finish for the mating components may not be required.

Another advantage of an embodiment of the present invention is that the unitized design allows for assembly of both portions of the seal simultaneously without requiring a contact spacer to be mounted between the seal and sleeve components. The elimination of the spacer will reduce torque loss, minimize the noise, and decrease heat generation by reducing the friction between components. Yet, when assembled onto the axle, the seal allows for the required axial spacing between the rotating and stationary portions of the seal.

A further advantage of an embodiment of the present invention is that the assembly of the unitized design, without spacers, does not require special assembly methods in order to provide the required spacing between components.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein:

FIG. 3 is a view similar to FIG. 2, but illustrating the pinion seal assembly assembled further onto the axle flange;

FIG. 4 is a view similar to FIG. 3, but illustrating the pinion seal assembly completely assembled onto the axle flange;

DETAILED DESCRIPTION OF THE PREFERRED EMBODIMENTS

The following description of the preferred embodiment(s) is merely exemplary in nature and is in no way intended to limit the invention, its application, or uses.

Figure 1:
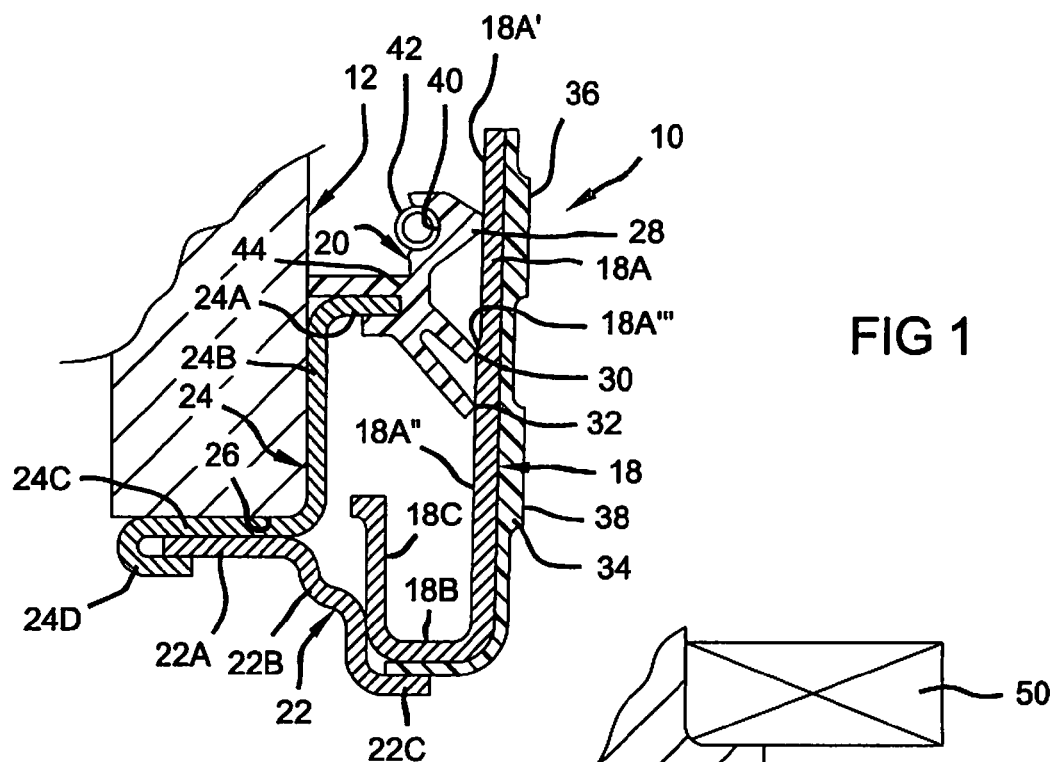
FIG. 1 is a cross sectional view of a pinion seal assembly according to the principles of the present invention, installed in a carrier/bearing cage bore, but before assembly onto an axle flange.
Figure 2:
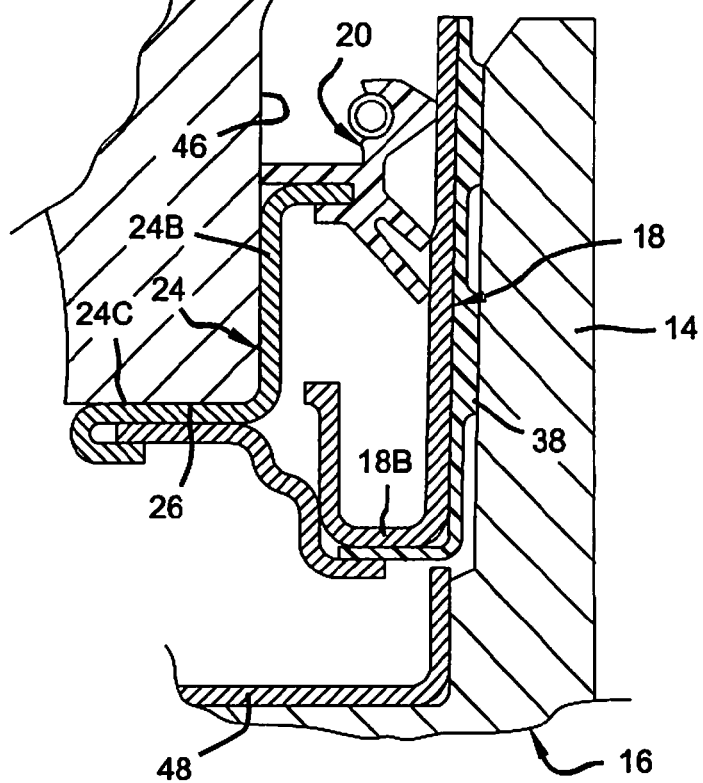
FIG. 2 is a view similar to FIG. 1 but illustrating the pinion seal assembly as it begins to be installed on the axle flange.

With reference to FIGS. 1-4, a pinion seal assembly 10 is shown at four different stages of being assembled to a carrier/bearing cage 12 and a companion flange 14 of an axle 16 (FIG. 2). The pinion seal assembly 10 is preassembled and includes a metal sleeve portion 18 slidably engaging a seal portion 20 and a first metal retainer ring 22. A second metal retainer ring 24 engages a shoulder 26 on the carrier/bearing cage 12 and engages the first metal retainer ring 22 as well as the seal portion 20. The pinion seal assembly 10 is preassembled with the sleeve portion 18, seal portion 20, first retainer ring 22, and second retainer ring 24 all engaged as will be described in greater detail herein. The preassembly is done prior to installation of the pinion seal assembly 10 onto the axle 16. Since the components of the pinion seal assembly 10 are already assembled, the internal area between the sleeve portion 18 and seal portion 20 including seal lips 28, 30, 32 will not be exposed during assembly on the axle 16. Thus, the chance of contaminants entering or interfering with the seal lips 28, 30, 32 is greatly reduced.

The sleeve portion 18 is ring shaped with a generally J-shaped cross-section having a first axially extending ring portion/leg 18A, a radially extending ring portion/leg 18B, and a second axially extending ring portion/leg 18C. The first axially extending ring portion/leg 18A and radially extending ring portion/leg 18B are covered with an elastomeric seal layer 34 including a pair of raised rib portion 36, 38. An outer surface of the first axially extending ring portion/leg 18A of sleeve portion 18 includes a first portion/leg 18A' having a first predetermined diameter and a second rearward portion/leg 18A" having a larger diameter than the forward portion/leg 18A' with a ramp portion 18A''' being disposed therebetween. It should be understood that other configurations of the sleeve can be utilized. The seal rings 36, 38 of the sleeve portion 18 are adapted to engage the companion flange 14 of the axle 16 in the assembled condition.

The seal portion 20 is provided with the first, second, and third seal lips 28, 30, 32. The seal portion 20 has a recessed region 40 disposed in the vicinity of the first seal lip 28. The recessed portion 40 is adapted to receive a garter spring 42 therein for applying a radially inward force to the seal portion 20. The seal portion 20 includes a body portion 44 which engages a first radially inwardly extending flange portion/leg 24A of the second metal retainer ring 24. The second/leg retainer ring 24 includes a second axially extending ring portion 24B/leg and a third radially outwardly extending flange portion/leg 24C which has an end portion/leg 24D which is crimped around a radially outwardly extending flange portion/leg 22A of the first retainer ring 22. The first retainer ring 22 also includes an axially extending ring portion/leg 22B having an inner diameter surface which engages the second axially extending ring portion/leg 18O of sleeve portion 18. The first retainer ring 22 includes a radially inwardly extending flange portion/leg 22C which engages the radially extending ring portion/leg 18B of sleeve portion 18 as illustrated in FIGS. 1-3.

With reference to FIG. 2, the pinion seal assembly 10 is inserted into a bore 46 such that the seal portion 20 and axially extending ring portion/leg 24B of the second retainer ring 24 are received in and engage the bore 46. The radially outwardly extending flange portion/leg 24C of the second retainer ring 24 engages shoulder 26 of carrier/bearing cage. As shown in FIG. 2, the axle companion flange 14 of axle 16 is inserted into the sleeve portion 18, with the inner diameter of the elastomeric seal 38 initially sliding along the companion flange 14 without an interference fit (as best seen in FIG. 2). With further insertion of the companion flange 14, a radial interference begins to develop between the companion flange 14 and the elastomeric seal 38. The seal 38 and sleeve portion 18 are sized and shaped so that a radial interference condition develops between the seal 38 and the companion flange 14 as the companion flange 14 slides farther into the sleeve portion 18. The interference-condition between the sleeve portion 18 and the companion flange 14 might be designed to occur at any location on the flange 14, or any other component that is assembled to it that is stationery with respect to the flange 14, such as a flange deflector. With further insertion of the companion flange 14, an axial interference condition develops between a deflector 48 and the sleeve 18 (the sleeve abuts the deflector). The axial interference condition between the sleeve 18 may be designed to occur at any location on the deflector 48, flange 14, or any other component that is assembled to and is stationary with respect to the flange 14. The axial interference condition developed prevents further sliding motion between the sleeve 18 and companion flange 14 and is designed to occur before the companion flange 14 abuts the bearing 50. Further installation of the companion flange 14 then causes the sleeve 18 to disengage the first assembly ring 22 before the companion flange 14 reaches the final assembled position, abutting bearing 50 (best seen in FIG. 4).

The deflector 48 is provided on axle 16 and eventually abuts against the radially extending ring portion/leg 18B of sleeve portion 18, as best seen in FIG. 3. The final radial interference fit, after being fully installed, holds the sleeve portion 18 stationary relative to the companion flange 14 during operation of the axle 16.

The axial retention level due to the press fit of the sleeve portion 18 onto the first retainer ring 22 is preferably greater than the axial installation load created when the axle companion flange 14 is inserted through the inner diameter of the sleeve portion 18. As a result, the seal portion 20 remains generally stationary relative to the sleeve portion 18 during the initial part of the installation.

In the completed assembly, the companion flange 14 is fully assembled relative to the carrier/bearing cage 12, with the second retainer ring 24 fully assembled to the carrier/bearing cage 12 and the sleeve portion 18 fully assembled to the companion flange 14 of axle 16 such that a proper axial spacing exists between the seal portion 20 and the sleeve portion 18. During operation, the sleeve portion 18 can rotate with the companion flange 14, while the seal portion 20 remains stationary with the carrier/bearing cage 12, with the only contact between the two being sealing lips 28, 30, 32. Thus, the proper sealing is assured while minimizing the friction between the two portions of the pinion seal assembly 10.

Figure 5:
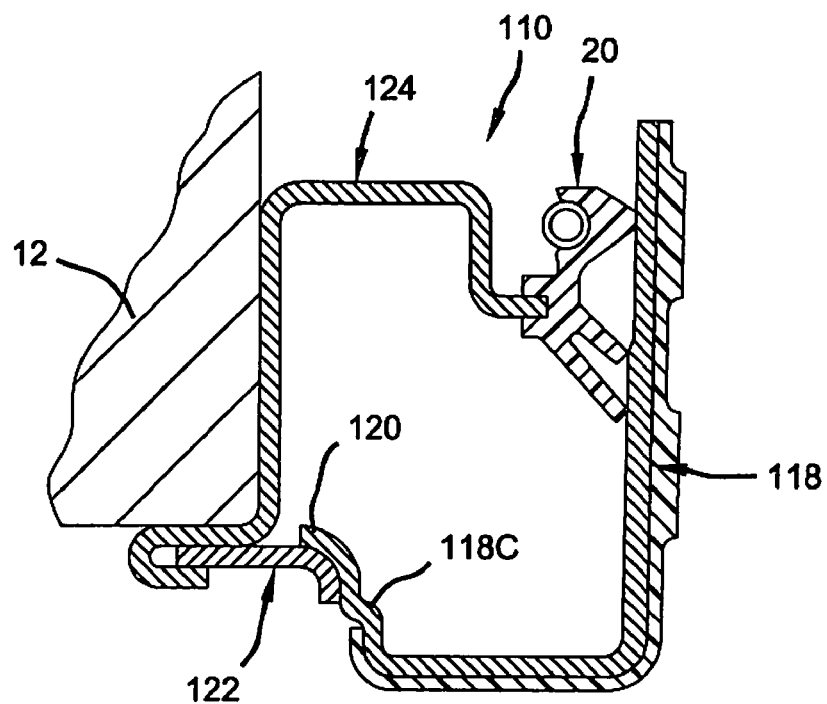
FIG. 5 is a cross-section of a second embodiment of the pinion seal assembly according to the principles of the present invention.
Figure 6:
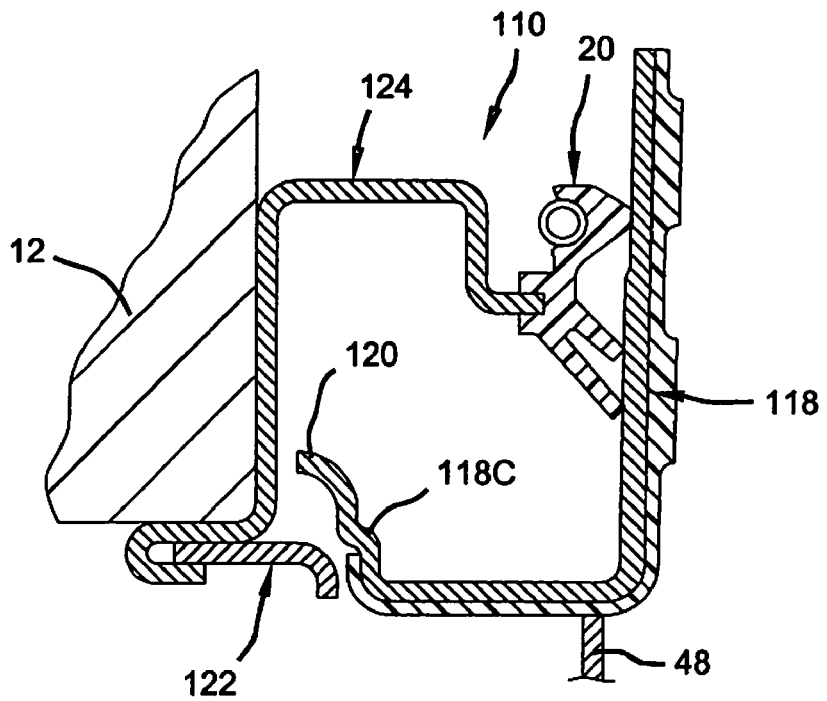
FIG. 6 is a cross-section of the pinion seal of FIG. 5 shown in a fully assembled condition.

FIGS. 5 and 6 illustrate an alternate embodiment of the pinion seal assembly 110. In this embodiment, the sleeve portion 118 is modified to include a radially outwardly extending flange 120 extending from the second axially extending ring portion/leg 118 such that the flange 120 engages the first retainer ring 122. In this embodiment, the first retainer ring 122 does not include a radially inwardly extending flange portion such as radially inwardly extending flange 22C of the first retainer ring 22 disposed in the embodiment shown in FIGS. 1-4. In addition, the shape of the second retaining ring 124 has also been changed in order to demonstrate the differing configurations that can be utilized. As illustrated in FIG. 6, the pinion seal assembly 110 is shown in a fully assembled condition such that the sleeve portion 118 is moved axially relative to the seal portion 20. Although the shape and configuration of some of the components are different, the installation process and resulting axial spacing for the pinion seal assembly 110 are the same as in the first embodiment as described above with reference to FIGS. 1-4.

Figure 7:
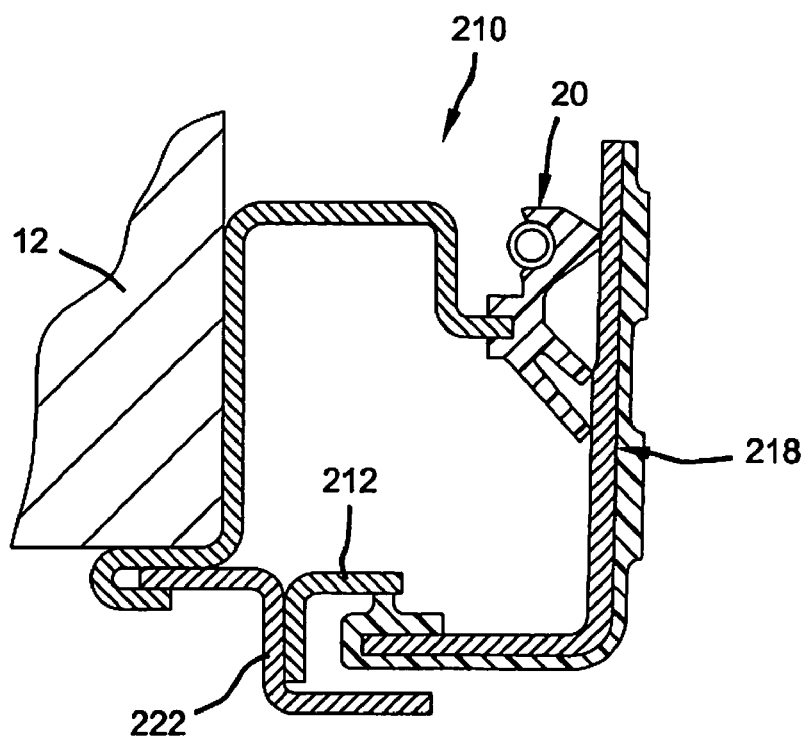
FIG. 7 is a cross-section of a third embodiment of the pinion seal assembly according to the principles of the present invention.

With reference to FIG. 7, an additional alternative embodiment of the pinion seal assembly 210 is shown. In this embodiment, the pinion seal assembly 210 includes a separate component 212 that supports the sleeve portion 218 during the initial phase of the installation. After the axial interference condition between the sleeve portions 218 and companion flange (not shown in FIG. 7) develops, the separate component 212 preferably disengages from the first retainer ring 222 or sleeve portion 218 due to the further axial motion of the companion flange. The component 212 then becomes spaced from the portion from which it separated, which can be due to gravity, springs, separation of press-fit components, or similar means.

Figure 8:
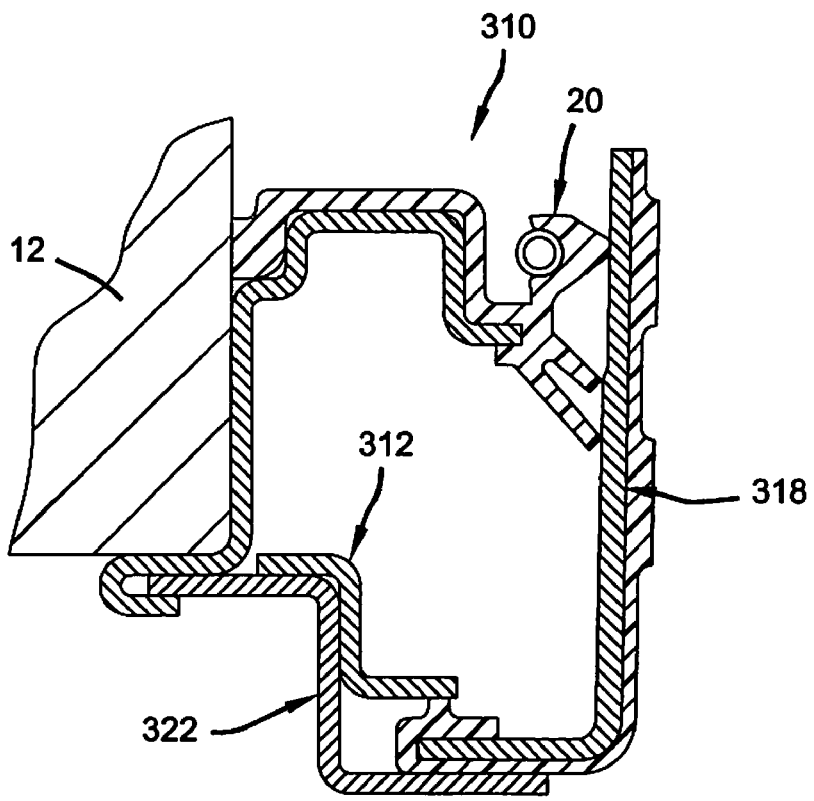
FIG. 8 is a cross-section of a fourth embodiment of the pinion seal assembly according to the principles of the present invention.

With reference to FIG. 8, a fourth embodiment of the pinion seal assembly 310 is provided. In this embodiment, the pinion seal assembly 310 includes a separate component 312 that supports the sleeve portion 318 during the initial phase of the installation. After the axial interference condition between the sleeve portion 318 and companion flange (not shown) develops, the separate component 312 preferably disengages from either the first retainer ring 322 or sleeve portion 318 due to the further axial motion of the companion flange. The component 312 then becomes spaced from the portion from which it separated, which can be due to gravity, springs, separation of press-fit components or similar means.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A unitized pinion seal for mounting between a first member and a second member rotatable relative to the first member, the unitized pinion seal comprising:
    a metal sleeve including a first axially extending leg having an inner surface covered with an elastomeric seal layer adapted to mount rotationally fixed to the first member, a radially extending leg extending radially outward from an end of said first axially extending leg and a second axially extending leg extending axially from a radially outer end of said radially extending leg;
    a metal retainer having a first axially extending leg slidably mounted directly to the second axially extending leg of said metal sleeve in a radial interference fit and having a second leg adapted to mount to the second member and a third leg engaging said radially extending leg of said metal sleeve, said first axially extending leg having a smaller diameter than said second leg of said metal retainer; and
    a seal mounted to said retainer and engaging said first axially extending leg of said metal sleeve;
    wherein said metal retainer is disengaged from said metal sleeve during assembly of said metal sleeve on to said first member, such that said third leg of said metal retainer is moved axially away from said radially extending leg of said metal sleeve.

2. The unitized pinion seal of claim 1 wherein the first member is an axle companion flange and the second member is a carrier/bearing cage.

3. The unitized pinion seal of claim 1 wherein the metal sleeve is adapted to install to the first member with a radial interference fit such that the radial interference fit of the seal to the metal sleeve creates a greater axial retention load than an axial installation load created by the interference fit of the metal sleeve relative to the first member.

4. The unitized pinion seal of claim 3 wherein said metal retainer first axially extending leg and said third leg are portions of a first retainer ring engaging said metal sleeve prior to assembly of said unitized pinion seal to said first member.

5. The unitized pinion seal of claim 4, wherein said metal retainer second leg is a portion of a second retainer ring engaging the seal.

6. The unitized pinion seal of claim 1, wherein said seal includes first and second sealing lip engaging said first axially extending leg of said metal sleeve.

7. The unitized pinion seal of claim 6, wherein said seal includes a third sealing lip engaging said first axially extending leg of said metal sleeve.

8. The unitized pinion seal of claim 1, wherein the first and second axially extending legs of said metal sleeve include a length greater than a length of said radially extending leg of said metal sleeve.

9. The unitized pinion seal of claim 5, wherein said third leg of said first retainer ring includes a radially extending leg extending from one end of said first axially extending leg of said first retainer ring, said first retainer ring further comprising a second radially extending leg extending from another end of said first axially extending leg; and
    wherein said second retainer ring includes a first radially extending leg extending from an end of said second leg and mounted to said seal, and a third radially extending leg extending from another end of said second leg of said second retainer ring and engaging said second radially extending leg of said first retainer ring and adapted to engage said second member.

10. The unitized pinion seal of claim 1, wherein the elastomeric seal layer further comprises a pair of spaced apart raised rib portions adapted to engage the first member.

11. The unitized pinion seal of claim 2, wherein the axle companion flange further includes a deflector, the deflector configured to engage the radially extending leg of the metal sleeve during assembly of the metal sleeve to the axle companion flange and disengage the metal sleeve from the first retainer ring.

12. A unitized pinion seal for mounting between a first member and a second member rotatable relative to the first member, the unitized pinion seal comprising:
    a metal sleeve adapted to mount rotationally fixed to the first member, said sleeve including an outer surface having a ramp portion disposed between an axially extending forward cylindrical leg and an axially extending rear cylindrical leg, wherein said axially extending forward cylindrical leg has a smaller diameter than said axially extending rear cylindrical leg, a radially extending leg extending radially outward from an end of said axially extending rear cylindrical leg; and
    a seal supported by a metal retainer, said metal retainer including a first axially extending leg which is mounted directly to an axially extending surface of the metal sleeve in a radial interference fit and said metal retainer including a second leg adapted to mount to the second member, said metal retainer having a leg engaging said radially extending leg of said metal sleeve, said seal including a first seal lip engaging said axially extending forward cylindrical leg and a second seal lip engaging said axially extending rear cylindrical leg;
    wherein said metal retainer is disengaged from said metal sleeve during assembly of said metal sleeve on to said first member, such that said leg of said metal retainer is moved axially away from said radially extending leg of said metal sleeve.

13. The unitized pinion seal of claim 12, wherein the seal includes a third seal lip positioned adjacent the second seal lip and engaging said axially extending rear cylindrical leg of said metal sleeve.

14. The unitized pinion seal of claim 12, wherein said radially extending leg of said metal sleeve extending radially outward and an axially extending leg extending axially from a radially outer end of said radially extending leg, said metal retainer first axially extending leg being mounted to a surface of said axially extending leg of said metal sleeve; and
    wherein said axially extending leg and said axially extending forward and rear cylindrical of said metal sleeve each include a length greater than a length of said radially extending portion of said metal sleeve.

15. The unitized pinion seal of claim 14, wherein said first axially extending leg of said metal retainer is a portion of a rigid first retainer ring, said first retainer ring including a first radially extending leg extending from one end of the first axially extending leg and a second radially extending leg extending from an opposite end of said first axially extending leg and engaging said radially extending leg of said metal sleeve.

16. The unitized pinion seal of claim 15, wherein said second retainer leg is a portion of a second retainer ring, said second retainer ring including a first radially extending leg extending radially inward from an end of said second retainer leg and supporting said seal, and a third radially extending leg extending from another end of said second retainer leg in a radially outward direction, said third radially extending leg engaging said first radially extending leg of said first retainer ring and adapted to mount to said second member.

17. The unitized pinion seal of claim 12, wherein the metal sleeve further includes an elastomeric seal layer covering a surface of the axially extending forward and rear cylindrical leg of the metal sleeve adapted to mount rotationally fixed to the first member, the elastomeric seal layer including a pair of raised sealing ribs, with one of the ribs positioned adjacent the axially extending forward leg and the other positioned adjacent the axially extending rearward leg of the metal sleeve.

18. A unitized pinion seal for mounting between a first member and a second member rotatable relative to the first member, the unitized pinion seal comprising:

a sleeve including a first axially extending ring portion at least partially covered with an elastomeric seal layer adapted to mount rotationally fixed to the first member, a radially extending portion extending radially outward from an end of said first axially extending ring portion and a second axially extending ring portion extending axially from a radially outer end of said radially extending portion, said first and second axially extending ring portions of said sleeve having a length greater than a length of said radially extending portion of said sleeve, and said elastomeric seal layer including a pair of spaced apart raised ribs;

a first retainer having a first axially extending portion slidably mounted directly to the second axially extending ring portion of said sleeve in a radial interference fit, a second radially inward extending portion extending from one end of said first axially extending portion and engaging said radially extending portion of said sleeve, and a third radially extending portion extending radially outward from an opposite end of said first axially extending portion of said first retainer ring;

a second retainer ring having an axially extending portion adapted to engage said second member, a first radially extending portion extending radially outward from an end of said axially extending portion of said second retainer ring and adapted to engage said second member on one side and coupled to said first retainer ring on another side, and a second radially extending portion extending radially inward from an opposite end of said second retainer ring axially extending portion, said first axially extending portion of said first retainer ring having a smaller diameter than said axially extending portion of said second retainer ring; and a seal having a body portion mounted to said second radially extending portion of said second retainer ring, and first, second and third sealing lips extending from said body portion and engaging said first axially extending ring portion of said sleeve;

wherein said first retainer ring is disengaged from said sleeve by said first member engaging said radially extending portion of said sleeve during assembly of said sleeve on to said first member.

* * * * *